US011890873B2

(12) United States Patent
Dufort et al.

(10) Patent No.: US 11,890,873 B2
(45) Date of Patent: Feb. 6, 2024

(54) SYSTEM AND METHOD FOR COMPENSATING FOR VIBRATIONS IN AN INKJET PRINTER

(71) Applicant: Xerox Corporation, Norwalk, CT (US)

(72) Inventors: Ron E. Dufort, Rochester, NY (US); Elizabeth L Barrese, Penfield, NY (US); Dara N. Lubin, Pittsford, NY (US); Matthew J. Ochs, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 208 days.

(21) Appl. No.: 17/649,417

(22) Filed: Jan. 31, 2022

(65) Prior Publication Data

US 2023/0241897 A1 Aug. 3, 2023

(51) Int. Cl.

| | |
|---|---|
| ***B41J 2/175*** | (2006.01) |
| ***B41J 2/14*** | (2006.01) |
| ***B41J 2/045*** | (2006.01) |
| ***B41J 11/00*** | (2006.01) |

(52) U.S. Cl.

CPC ......... *B41J 2/1752* (2013.01); *B41J 2/04505* (2013.01); *B41J 2/14153* (2013.01); *B41J 11/0095* (2013.01)

(58) Field of Classification Search

CPC .. B41J 2/04505; B41J 2/14153; B41J 2/1752; B41J 11/0095; B41J 11/20

See application file for complete search history.

(56) References Cited

U.S. PATENT DOCUMENTS

| | | | |
|---|---|---|---|
| 5,000,591 A | | 3/1991 | Burgess |
| 5,366,301 A | | 11/1994 | Martin et al. |
| 8,366,230 B2 | | 2/2013 | Taira et al. |
| 8,727,469 B2 | | 5/2014 | Hattori et al. |
| 9,160,892 B1 | | 10/2015 | Shelhart et al. |
| 9,278,531 B1 | | 3/2016 | lefevre et al. |
| 9,527,320 B2 | | 12/2016 | Shelhart et al. |
| 2014/0098153 A1 | | 4/2014 | Moore et al. |
| 2016/0229208 A1* | | 8/2016 | Neeb ...................... B41J 3/4073 |
| 2018/0090253 A1* | | 3/2018 | Songatikamas ....... G06F 3/0416 |
| 2021/0078318 A1* | | 3/2021 | Niiyama ................ B41J 3/4078 |

OTHER PUBLICATIONS

Kajiwara, I. et al., "Design of dielectric elastomer actuators for vibration control at high frequencies," International Journal of Mechanical Sciences, 2019, 157-158, pp. 849-857 (9 pages).

* cited by examiner

*Primary Examiner* — Anh T Vo

(74) *Attorney, Agent, or Firm* — Maginot Moore & Beck LLP

(57) ABSTRACT

An inkjet printer detects vibrations within the printer and compensates for the detected vibrations by adjusting a gap between the printheads and the media transport. Additionally, the inkjet printer detects media sheet heights that may cause damage as they pass through the print zone of the printer and adjusts the gap to enable the media sheets to pass through the print zone without contacting the printheads. A method of operating an inkjet printer so configured is also disclosed.

20 Claims, 5 Drawing Sheets

SYSTEM AND METHOD FOR COMPENSATING FOR VIBRATIONS IN AN INKJET PRINTER

TECHNICAL FIELD

This disclosure relates generally to devices that produce ink images on media, and more particularly, to vibrations in such devices.

BACKGROUND

Inkjet imaging devices eject liquid ink from printheads to form images on an image receiving surface. The printheads include a plurality of inkjets that are arranged in some type of array. Each inkjet has a thermal or piezoelectric actuator that is coupled to a printhead controller. The printhead controller generates firing signals that correspond to digital data for images. Actuators in the printheads respond to the firing signals by expanding into an ink chamber to eject ink drops onto an image receiving member and form an ink image that corresponds to the digital image data used to generate the firing signals. The image receiving member can be a continuous web of media material or a series of media sheets.

Vibrations in printers can produce image quality issues. These issues become most apparent when a vibration occurs after ink drops are ejected from the printheads and before the drops land on the media being printed because the distance between the printheads in the printhead array and the surface of the image receiving member is sensitive to changes. If this gap increases or decreases after drops are ejected then the drops do not land where they were intended to land because drop travel time has increased or decreased. This distance change coupled with the moving of the media in the process direction alters the position where the drops land. This change in drop position affects registration of the differently colored ink drops so secondary colors and other colors formed with multiple colors of ink drops are altered from their intended hue.

Efforts to address vibrations in inkjet printers have been simplistic. They include placing the printers on thick rubber mats to absorb the vibrations. Other approaches have included tightly coupling the media transport to the printhead assemblies so they move together. While this resulting large moment of inertia can dampen smaller vibrations to help maintain drop position and correspondingly image quality, it fails to address the larger vibrations in the vertical direction that change the gap between the printheads and the media noted above.

Changes in the printhead to media gap can also cause damage to printer components. If the gap is too small, the image receiving member can burnish the face of the printheads. Burnishing not only reduces the life of the printheads, but results in poor image quality, unintentional markings, and increased downtime of the printer during maintenance. If the gap is too large, image quality suffers, particularly in high speed printers, since a large gap can affect the accuracy of the ejected ink drops landing on the image receiving member to form the printed image. Thus, correctly setting and maintaining the gap distance between a printhead and an image receiving member is an important parameter in inkjet printer operation. A nominal gap distance between printheads and an image receiving surface for typically used media can be, for example, about 1 mm or less. As used in this document, the term "nominal printhead/media gap distance" means the smallest distance between a printhead and an upper surface of media being printed without causing print job faults arising from media issues.

Some types of media have a tendency to wrinkle when they are printed with high ink coverage areas because the amount of solvent that they absorb from the ejected ink distends the media surface. The threshold for what constitutes a high ink coverage area is lower for thinner media than it is thicker media. Coatings on papers also alter the response of the media to ink and ink solvent absorption. Additionally, the types of ink used for printing affect the amount of solvent absorbed by media. Distended media has an unpredictable effect on the printhead face to media gap during a print job.

Previously known printers have included a sheet height sensor that generates a signal when a height of the media exceeds a height for a currently set printhead/media surface gap. The printhead array, the media transport, or both can be repositioned with actuators in response to height sensor signal to maintain a sufficient gap distance so that distended media does not impact the printhead. Adjusting the printhead/media surface gap in response to a real time height sensor signal, however, is extremely difficult in high speed printers. Therefore, the ability to monitor and adjust the gap between printheads and media in real time during a print job would be beneficial.

SUMMARY

An inkjet printer is configured to monitor and adjust the gap distance between printheads and the ink receiving surface of media being printed. The printer includes at least one printhead carrier plate, at least one printhead mounted to the at least one printhead carrier plate, a media transport path that is configured to carry media past the at least one printhead for printing ink images on the media, at least one actuator being mounted to the at least one printhead carrier plate, the at least one actuator being configured to move the at least one printhead carrier plate with respect to the media transport path in a direction that is perpendicular to a plane in the media transport path, and a controller operatively connected to the at least one actuator. The controller is configured to receive print job parameters for a print job, operate the at least one actuator to set a distance between the at least one printhead and the media transport path in the printer using a media type identified in the print job parameters, detect a vibration in the inkjet printer, and compensate for the detected vibration by operating the at least one actuator to adjust the distance between the at least one printhead and the media transport path.

A method of operating an inkjet printer monitors and adjusts the gap distance between printheads and the ink receiving surface of media being printed. The method includes receiving print job parameters for a print job with a controller, setting a printhead/media gap distance between at least one printhead and a media transport path in the printer using a media type identified in the print job parameters, detecting a vibration in the inkjet printer, and compensating for the detected vibration by adjusting the printhead/media gap distance.

BRIEF DESCRIPTION OF THE DRAWINGS

The foregoing aspects and other features of a printer and printer operational method that monitors and adjusts the gap distance between printheads and the ink receiving surface of media being printed are explained in the following description, taken in connection with the accompanying drawings.

DETAILED DESCRIPTION

Figure 1:
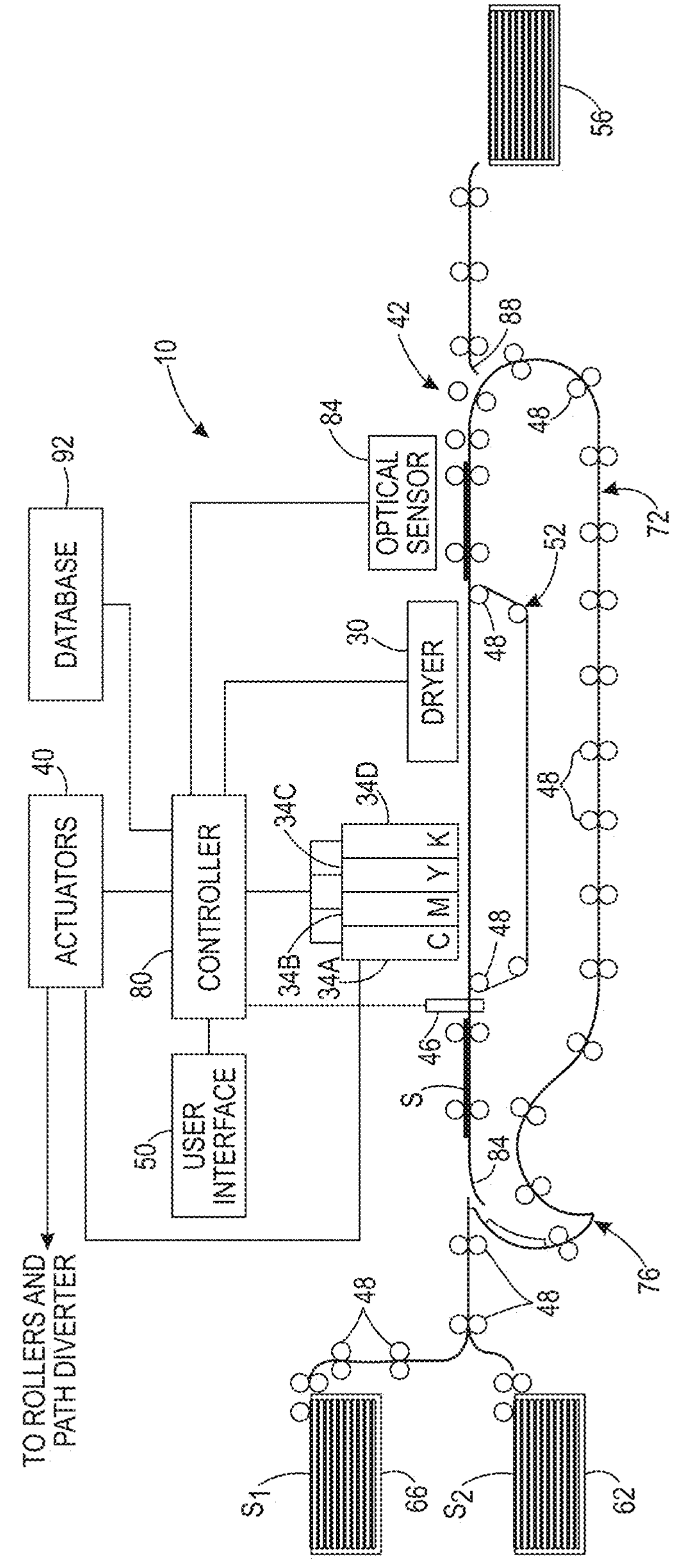
FIG. 1 is a schematic drawing of an inkjet printer that monitors and adjusts the gap distance between printheads and the ink receiving surface of media being printed.

For a general understanding of the environment for the printer and printer operational method disclosed herein as well as the details for the printer and the printer operational method, reference is made to the drawings. In the drawings, like reference numerals have been used throughout to designate like elements. As used herein, the word "printer" encompasses any apparatus that ejects ink drops onto different types of media to form ink images. The term "process direction" means the direction in which media sheets move past the printheads as the inkjets eject ink onto the sheets and the term "cross-process direction" means an axis that is perpendicular to the process direction in the plane of a media sheet passing the printheads.

FIG. 1 illustrates a high-speed inkjet image producing machine or printer 10 in which a controller 80 has been configured to perform the process 400 described below to adjust the printhead and media gaps in the printer to compensate for vibrations in the printer. As illustrated, the printer 10 is a printer that directly forms an ink image on a surface of a media sheet stripped from one of the supplies of media sheets $S_1$ or $S_2$ and the sheets S are moved through the printer 10 by the controller 80 operating one or more of the actuators 40 that are operatively connected to rollers 48 or to at least one driving roller of conveyor 52 that comprise the media transport 42. Conveyor 52 includes a frame in which rollers 48 are held and an endless belt is wrapped around these rollers. Actuators 40 are configured to rotate one or more of the rollers 48 within the conveyor 52 to rotate the endless belt and move media sheets through the print zone of printer 10. A sheet height sensor 46 is positioned to identify the heights of the media sheets shortly before they enter the print zone of printer 10. This sensor 46 is operatively connected to the controller 80 to provide sheet heights to the controller for use in regulating the printhead/media gap distances in the print zone. In one embodiment, each printhead module has only one printhead that has a width that corresponds to a width of the widest media in the cross-process direction that can be printed by the printer. In other embodiments, the printhead modules have a plurality of printheads with each printhead having a width that is less than a width of the widest media in the cross-process direction that the printer can print. In these modules, the printheads are arranged in an array of staggered printheads that enables media wider than a single printhead to be printed. Additionally, the printheads within a module or between modules can also be interlaced so the density of the drops ejected by the printheads in the cross-process direction can be greater than the smallest spacing between the inkjets in a printhead in the cross-process direction. Although printer 10 is depicted with only two supplies of media sheets, the printer can be configured with three or more sheet supplies, each containing a different type and size of media.

Figure 2:
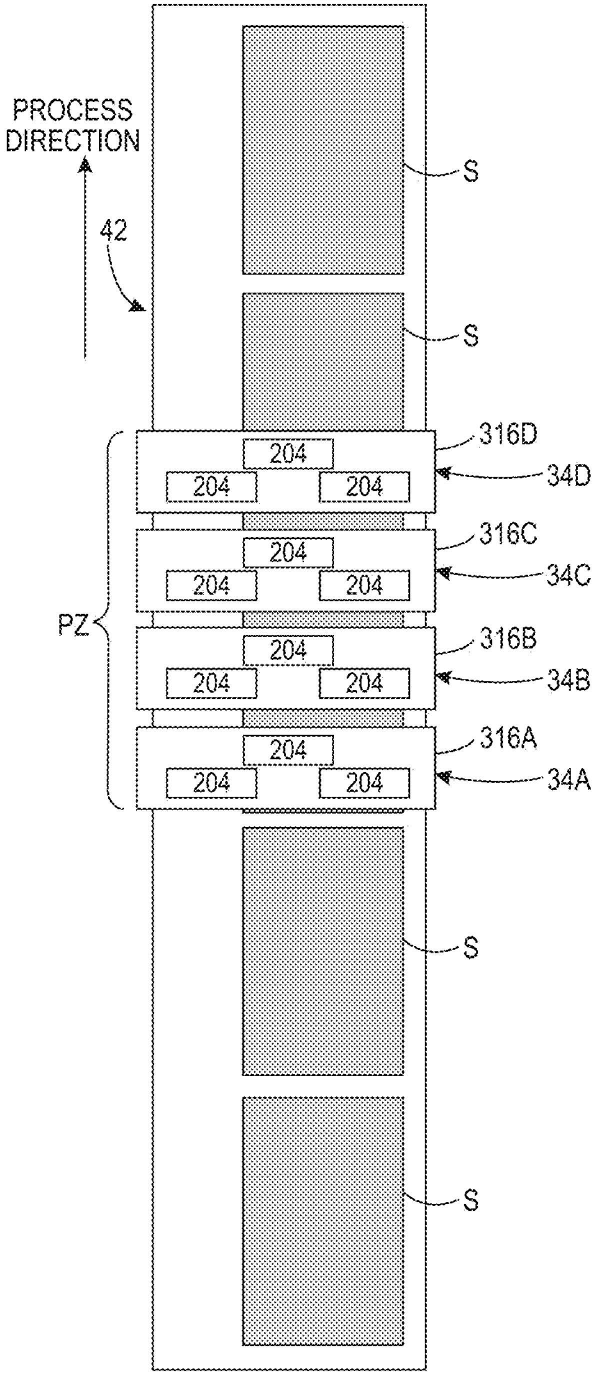
FIG. 2 is a top view of the print zone in the printer of FIG. 1.

The print zone PZ is shown in FIG. 2. The print zone PZ has a length in the process direction commensurate with the distance from the first inkjets that a sheet passes in the process direction to the last inkjets that a sheet passes in the process direction and it has a width that is the maximum distance between the most outboard inkjets on opposite sides of the print zone that are directly across from one another in the cross-process direction. Each printhead module 34A, 34B, 34C, and 34D shown in FIG. 2 has three printheads 204 mounted to each of the printhead carrier plates 316A, 316B, 316C, and 316D, respectively. Actuators are mounted to at least one end of each printhead carrier plate and are configured to move the carrier plates with respect to the media transport 42 as discussed more fully below to adjust the distance between the printheads on a carrier plate and the media transport to compensate for vibrations occurring in the printer during a print job.

As shown in FIG. 1, the printed image passes under an image dryer 30 after the ink image is printed on a sheet S. The image dryer 30 can include an infrared heater, a heated air blower, air returns, or combinations of these components to heat the ink image and at least partially fix an image to the web. An infrared heater applies infrared heat to the printed image on the surface of the web to evaporate water or solvent in the ink. The heated air blower directs heated air over the ink to supplement the evaporation of the water or solvent from the ink. The air is then collected and evacuated by air returns to reduce the interference of the air flow with other components in the printer.

A duplex path 72 is provided to receive a sheet from the transport system 42 after a substrate has been printed and move it by the rotation of rollers in an opposite direction to the direction of movement past the printheads. At position 76 in the duplex path 72, the substrate is turned over so it can merge into the job stream being carried by the media transport system 42. Movement of pivoting member 88 provides access to the duplex path 72. Rotation of pivoting member 88 is controlled by controller 80 selectively operating an actuator 40 operatively connected to the pivoting member 88. When pivoting member 88 is rotated counterclockwise as shown in FIG. 1, a substrate from media transport 42 is diverted to the duplex path 72. Rotating the pivoting member 88 in the clockwise direction from the diverting position closes access to the duplex path 72 so substrates on the media transport continue moving to the receptacle 56. Another pivoting member 84 is positioned between position 76 in the duplex path 72 and the media transport 42. When controller 80 operates an actuator to rotate pivoting member 84 in the counterclockwise direction, a substrate from the duplex path 72 merges into the job stream on media transport 42. Rotating the pivoting member 84 in the clockwise direction closes the duplex path access to the media transport 42.

As further shown in FIG. 1, the printed media sheets S not diverted to the duplex path 72 are carried by the media transport to the sheet receptacle 56 in which they are be collected. Before the printed sheets reach the receptacle 56, they pass by an optical sensor 84. The optical sensor 84 generates image data of the printed sheets and this image data is analyzed by the controller 80, which is configured to determine which inkjets, if any, that were operated to eject ink did in fact do so or if they did not eject an ink drop having an appropriate mass or that landed errantly on the sheet. Any inkjet operating in this manner is called an inoperative inkjet in this document. The controller can store data identifying the inoperative inkjets in a memory operatively connected to the controller. A user can operate the user interface 50 to obtain reports displayed on the interface that identify the number of inoperative inkjets and the printheads in which the inoperative inkjets are located. The optical sensor can be a digital camera, an array of LEDs and photodetectors, or other devices configured to generate image data of a passing surface. As already noted, the media transport also includes a duplex path that can turn a sheet over and return it to the transport prior to the printhead modules so the opposite side of the sheet can be printed. While FIG. 1 shows the printed sheets as being collected in the sheet receptacle, they can be directed to other processing stations (not shown) that perform tasks such as folding, collating, binding, and stapling of the media sheets.

Operation and control of the various subsystems, components and functions of the machine or printer 10 are performed with the aid of a controller or electronic subsystem (ESS) 80. The ESS or controller 80 is operably connected to the components of the printhead modules 34A-34D (and thus the printheads), the actuators 40, and the dryer 30. The ESS or controller 80, for example, is a self-contained, dedicated mini-computer having a central processor unit (CPU) with electronic data storage, and a display or user interface (UI) 50. The ESS or controller 80, for example, includes a sensor input and control circuit as well as a pixel placement and control circuit. In addition, the CPU reads, captures, prepares, and manages the image data flow between image input sources, such as a scanning system or an online or a work station connection (not shown), and the printhead modules 34A-34D. As such, the ESS or controller 80 is the main multi-tasking processor for operating and controlling all of the other machine subsystems and functions, including the printing process.

The controller 80 can be implemented with general or specialized programmable processors that execute programmed instructions. The instructions and data required to perform the programmed functions can be stored in memory associated with the processors or controllers. The processors, their memories, and interface circuitry configure the controllers to perform the operations described below. These components can be provided on a printed circuit card or provided as a circuit in an application specific integrated circuit (ASIC). Each of the circuits can be implemented with a separate processor or multiple circuits can be implemented on the same processor. Alternatively, the circuits can be implemented with discrete components or circuits provided in very large scale integrated (VLSI) circuits. Also, the circuits described herein can be implemented with a combination of processors, ASICs, discrete components, or VLSI circuits.

In operation, image data for an image to be produced are sent to the controller 80 from either a scanning system or an online or work station connection for processing and generation of the printhead control signals output to the printhead modules 34A-34D. Along with the image data, the controller receives print job parameters that identify the media weight, media dimensions, print speed, media type, ink area coverage to be produced on each side of each sheet, location of the image to be produced on each side of each sheet, media color, media fiber orientation for fibrous media, print zone temperature and humidity, media moisture content, and media manufacturer. As used in this document, the term "print job parameters" means non-image content data for a print job.

Figure 3A:
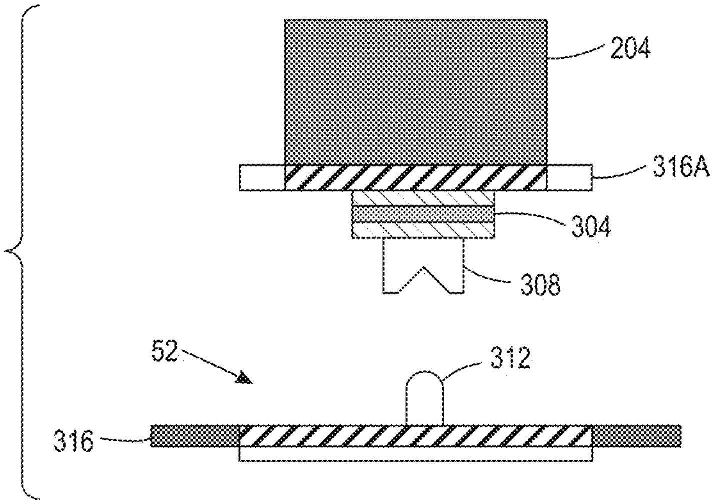
FIG. 3A is a side view of a docking pin receiver and adjustable docking pin mounted to at least one end of printhead carrier plate 316A shown in FIG. 2.

The side view of FIG. 3A shows one end of printhead carrier plate 316A and one of the printheads 204 mounted to the plate. An actuator 304 is mounted to the carrier plate 316A outside the cross-process width of the print zone. In one embodiment, the actuators 304 are dielectric elastomer actuators (DEAs) and the use of this type of actuator is described in more detail below. This actuator is not visible in FIG. 2 since it is mounted to the opposite side of the carrier plate 316A as shown in FIG. 2. Mounted to the actuator 304 is a docking pin receiver 308. Opposite the docking pin receiver 308 is a docking pin 312, which is mounted to the frame of conveyor 52. The docking pin 312 and the docking pin receiver 308 are shown separated at a distance useful for printhead maintenance and the like.

Figure 3B:
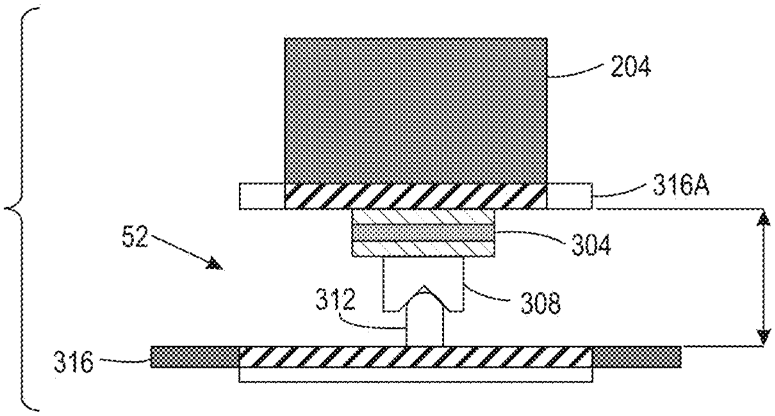
FIG. 3B is a side view of the docking pin receiver and adjustable docking pin at the pin's minimum extension.
Figure 3C:
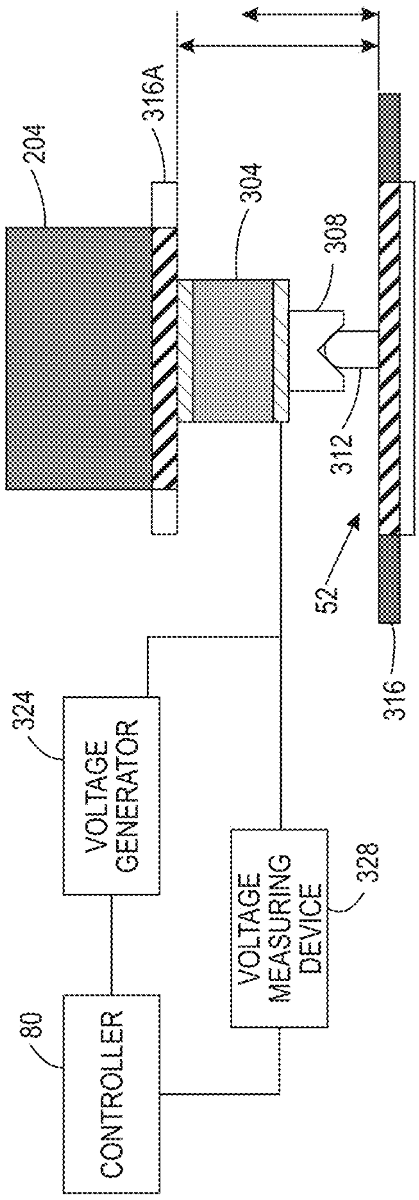
FIG. 3C is a side view of the docking pin receiver and adjustable docking pin at the pin's maximum extension with a block diagram of the system for controlling the position of the printhead carrier plate and compensating for vibrations in the printer.

The nominal printhead/media gap distance is set as shown in FIG. 3B with the docking pin 312 engaging docking pin receiver 308 and the actuator 304 is at its most compressed state. The actuator 304 is operated by the controller 80 to reach this most compressed state and the carrier plate 316A is moved to engage the docking pin 312 before the printer 10 performs any printing. FIG. 3C depicts the situation where the actuator 304 has been operated to increase the dimension of the actuator in a direction that is perpendicular to the plane of the conveyor 52. This movement urges the carrier plate 316A away from conveyor 52 and increases the printhead/media gap distance to enable thicker media to pass through the printhead/media gap, for example, or to compensate for vibrations detected in the printer 10 as described more fully below. Additionally, a controller, such as controller 80, is electrically coupled to a voltage generator to produce a voltage that operates the actuator to position the docking pin receiver with respect to the docking pin and to a voltage measuring device to measure the changes in the voltage caused by mechanical stresses on the actuator when the actuator is implemented with a DEA. The use of this system to compensate for vibrations in discussed in more detail below.

DEAs are known devices that are configured so an electrical voltage is supplied across the elastomeric dielectric in the actuator to contract the actuator in one axis while expanding it in the other axes. The shape of the actuator can be controlled electrically to adjust the position of the docking receiver 308 and, consequently, the gap distance between the printheads and the media passing through the print zone. The DEAs respond to voltage changes on the order of up to 30 milliseconds so the gaps can be adjusted in the time interval between print jobs, between passing media sheets, or within a length of a sheet in the process direction. Thus, the use of DEAs for actuators 304 enables gap distance adjustments to be made during the time between print jobs so the gap can be varied for different print job types such as a packaging job that prints card-stock and a magazine job that prints on thin media. The gaps are also adjusted during the inter-document zones (IDZs) between adjacent media sheets in the process direction during a print job. This type of adjustment allows the gap to change to accommodate the use of different media types during the same print job. The response time of the DEAs also enables gap changes during the printing of a single sheet so uneven media such as ID card stock can be printed. These changes in sheet heights or media types can be detected using the signal generated by the sheet height sensor 46 or from the parameters for a print job identifying the sheets being printed in the print job.

Mechanical stresses on DEAs that change the size of their dimensions produce voltage signals corresponding to the magnitude and direction of the strain. Thus, by coupling them to voltage measurement device 328 and providing the voltage measurement to a controller, such as controller 80, the controller can operate the voltage generator 324 to provide a voltage signal to the DEAs to compensate for the change in the DEA dimension caused by the stress. This features means that a controller can continuously monitor the voltage across the DEAs using the signal generated by the voltage measuring device 328 and provide low amplitude, high-frequency, voltage adjustments that dampen environmental vibrations so the effects of the vibrations on the gap are attenuated sufficiently to prevent image quality issues from arising. This vibration compensation is useful to suppress the effects of vibrations caused by the drive motors rotating the rollers in the media transport 42 as well as the effects of vibrations on the printhead assembly produced by other machinery external to the printer in the printer operational environment.

In another embodiment, the actuator is a piezoelectric shim mounted to the docking pin receiver that is controlled by the controller 80 in a manner similar to that noted above with regard to the DEAs. Piezoelectric shims are typically designed to remain rigid in the position in which they are set so voltage changes are not expected. The piezoelectric material in such shims, however, can deform and produce changes in the voltage being provided to them, although these changes may not always be reliably detected and measured. In order to detect and measure the vibrations in the printer more reliably, the voltage measurement device 328 is replaced with an accelerometer mounted in proximity to the piezoelectric shim. The signal generated by the accelerometer that corresponds to vibrations being experienced by the piezoelectric shim are provided to a controller, such as controller 80, that operates the voltage generator 324 to change the signal controlling the piezoelectric shim to compensate for the vibrations measured by the accelerometer. In yet another embodiment, the actuator is a stepper motor mounted to the docking pin receiver to control the position of the docking pin receiver. Again, the voltage measurement device is replaced with an accelerometer mounted in proximity to the motor. The signal from the accelerometer is monitored as described with reference to the piezoelectric shim; however, the stepper motor does not have the granularity of movement or the response timing of a piezoelectric shim or a DEA so this embodiment is not as effective for compensating for high frequency vibrations.

Another aspect of control enabled by the various types of actuators noted above includes adjusting the printhead/media gap distance using a signal from the sheet height sensor 46. The sheet height sensor 46 can be a light source, such as a laser, and a light receiver, such as a photoreceptor, that generates a signal indicating whether it is receiving the laser or not. When the height of the sheet blocks the laser and the photoreceptor generates a signal that it is no longer receiving the laser, the controller operates the voltage generator to operate the actuator and change the current printhead/media gap distance to accommodate the change in sheet height. Other embodiments of sheet height sensors are known. This operation attenuates the likelihood that the media strikes on the printheads occur in the print zone. As the anomalous sheet passes through the print zone, the controller operates the voltage generators coupled to the carrier plates from the start of the print zone to its end to generate a voltage that returns the carrier plates to the appropriate distance for the non-anomalous sheets following the anomalous sheet. The anomalous sheet can be caused by absorption of moisture to the degree that wrinkle results or from improper engagement with the rollers or other media transport components.

Figure 4:
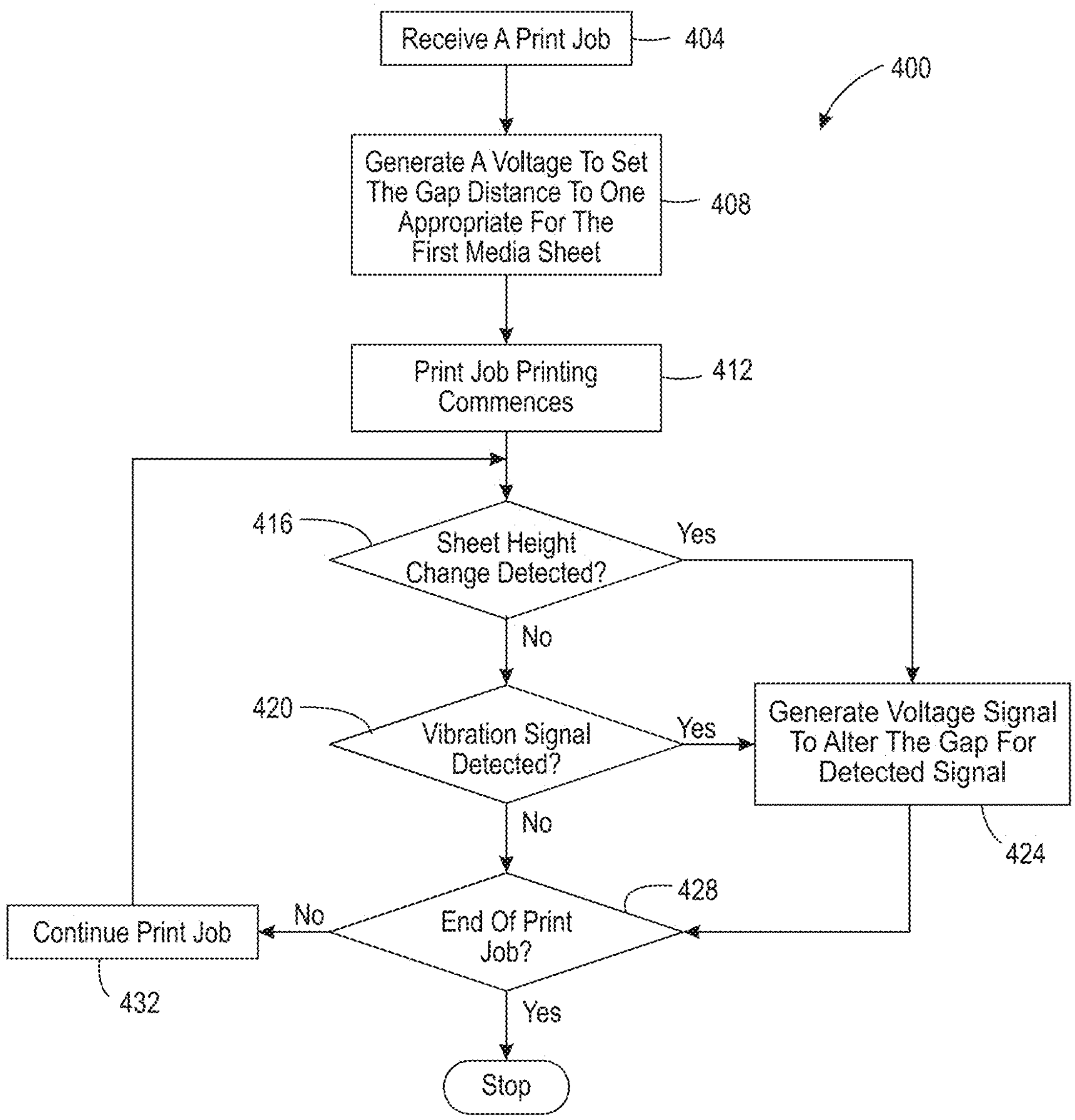
FIG. 4 is a flow diagram of a process for operating the printer of FIG. 1 to monitor vibrations and adjust the printhead and media gaps in the printer.

FIG. 4 depicts a flow diagram for a process 400 that operates the printer 10 to adjust the gap between printheads mounted to a printhead carrier plate and the media path carrying media sheets past the printheads on the plate. In the discussion below, a reference to the process 400 performing a function or action refers to the operation of a controller, such as controller 80, to execute stored program instructions to perform the function or action in association with other components in the printer. The process 400 is described as being performed with the printer 10 of FIG. 1 for illustrative purposes.

The process 400 for operating the printer 10 begins with the controller receiving a print job (block 404). A voltage is generated that operates the actuator 304 to set the gap distance for each printhead carrier plate to an appropriate distance for the first media sheet to be printed by the printer (block 408). Print job processing and printing begins (block 412). If a signal from the sheet height sensor (block 416) or a signal indicating a vibration capable of disrupting the gap (420), then the voltage generator is operated to change the gap distance to an appropriate height for the new media type, the anomalous media sheet, or the vibration (block 424). The process determines whether the end of the print job is detected (block 428). If the print job is not finished, the printing of the print job continues (block 432). Otherwise, the process stops.

It will be appreciated that variants of the above-disclosed and other features, and functions, or alternatives thereof, may be desirably combined into many other different systems or applications. Various presently unforeseen or unanticipated alternatives, modifications, variations, or improvements therein may be subsequently made by those skilled in the art, which are also intended to be encompassed by the following claims.

What is claimed is:

1. A method for operating an inkjet printer comprising:

receiving print job parameters for a print job with a controller;

setting a printhead/media gap distance between at least one printhead and a media transport path in the printer using a media type identified in the print job parameters;

detecting a vibration in the inkjet printer; and compensating for the detected vibration by adjusting the printhead/media gap distance.

2. The method of claim 1 further comprising:

operating with the controller at least one actuator to move a printhead carrier plate to which the at least one printhead is mounted to set and to adjust the printhead/media gap distance, the printhead carrier plate being moved relative to the media transport.

3. The method of claim 2, the operation of the at least one actuator further comprising:

generating a voltage signal provided to the at least one actuator.

4. The method of claim 3 wherein the at least one actuator is an at least one dielectric elastomer actuator (DEA).

5. The method of claim 4, the detection of the vibration further comprising:

measuring a change in the generated voltage signal that was caused by mechanical stress on the at least one DEA.

6. The method of claim 5 further comprising:

generating a signal corresponding to a height of a media sheet before the media sheet enters a print zone of the inkjet printer; and adjusting the printhead/media gap distance using the generated signal corresponding to the height of the media sheet.

7. The method of claim 3 wherein the at least one actuator is a piezoelectric shim or a stepper motor.

8. The method of claim 7, the detection of the vibration further comprising:

receiving from an accelerometer a signal corresponding to the vibration.

9. The method of claim 8 further comprising:

generating a signal corresponding to a change in media height between a media sheet in a print zone of the inkjet printer and a media sheet approaching the print zone; and adjusting the printhead/media gap distance using the generated signal corresponding to the change in media height.

10. An inkjet printer comprising:

at least one printhead carrier plate;

at least one printhead mounted to the at least one printhead carrier plate;

a media transport path that is configured to carry media past the at least one printhead for printing ink images on the media;

at least one actuator being mounted to the at least one printhead carrier plate, the at least one actuator being configured to move the at least one printhead carrier plate with respect to the media transport path in a direction that is perpendicular to a plane in the media transport path; and a controller operatively connected to the at least one actuator, the controller being configured to:

receive print job parameters for a print job;

operate the at least one actuator to set a distance between the at least one printhead and the media transport path in the printer using a media type identified in the print job parameters;

detect a vibration in the inkjet printer; and compensate for the detected vibration by operating the at least one actuator to adjust the distance between the at least one printhead and the media transport path.

11. The printer of claim 10 further comprising:

a pin mounted adjacent to the media transport path; and a receiver for engaging the pin, the receiver being mounted to the at least one actuator so operation of the actuator moves the receiver with respect to the pin.

12. The printer of claim 11 further comprising:

a voltage signal generator operatively connected to the at least one actuator; and the controller being further configured to operate the voltage signal generator to provide a voltage signal to the at least one actuator.

13. The printer of claim 12 wherein the at least one actuator is an at least one dielectric elastomer actuator (DEA).

14. The printer of claim 13 further comprising:

a voltage measurement device configured to generate a signal corresponding to a change in the voltage signal being provided to the at least one DEA; and the controller being operatively connected to the voltage measurement device, the controller further configured to:

receive the generated signal from the voltage measurement device; and operate the voltage signal generator using the generated signal from the voltage measurement device to adjust the distance between the at least one printhead and the media transport path in response to mechanical stress on the at least one DEA.

15. The printer of claim 14 further comprising:

a media height sensor configured to generate a signal corresponding to a height of a media sheet passing the media height sensor before the media sheet enters a print zone of the printer; and the controller being operatively connected to the media height sensor, the controller being further configured to:

adjust the distance between the at least one printhead and the media transport path using the generated signal corresponding to the height of the media sheet.

16. The printer of claim 15, the media height sensor further comprising:

a light source configured to direct a light beam across the media transport in a cross-process direction; and a light receiver configured to generate a signal indicative of whether the light receiver is receiving the light beam from the light source.

17. The printer of claim 13 wherein the at least one actuator is a piezoelectric shim or a stepper motor.

18. The printer of claim 17 further comprising:

an accelerometer configured to generate a signal corresponding to the vibration; and the controller being operatively connected to the accelerometer, the controller being further configured to:

operate the voltage generator using the signal generated by the accelerometer.

19. The printer of claim 18 further comprising:

a media height sensor configured to generate a signal corresponding to a height of a media sheet passing the media height sensor before the media sheet enters a print zone of the printer; and the controller being operatively connected to the media height sensor, the controller being further configured to:

adjust the distance between the at least one printhead and the media transport path using the generated signal corresponding to the height of the media sheet.

20. The printer of claim 19, the media height sensor further comprising:

a light source configured to direct a light beam across the media transport in a cross-process direction; and a light receiver configured to generate a signal indicative of whether the light receiver is receiving the light beam from the light source.

* * * * *